June 18, 1968 — R. D. SCOTT — 3,388,803
WEARABLE DIALYSIS APPARATUS
Filed April 16, 1965
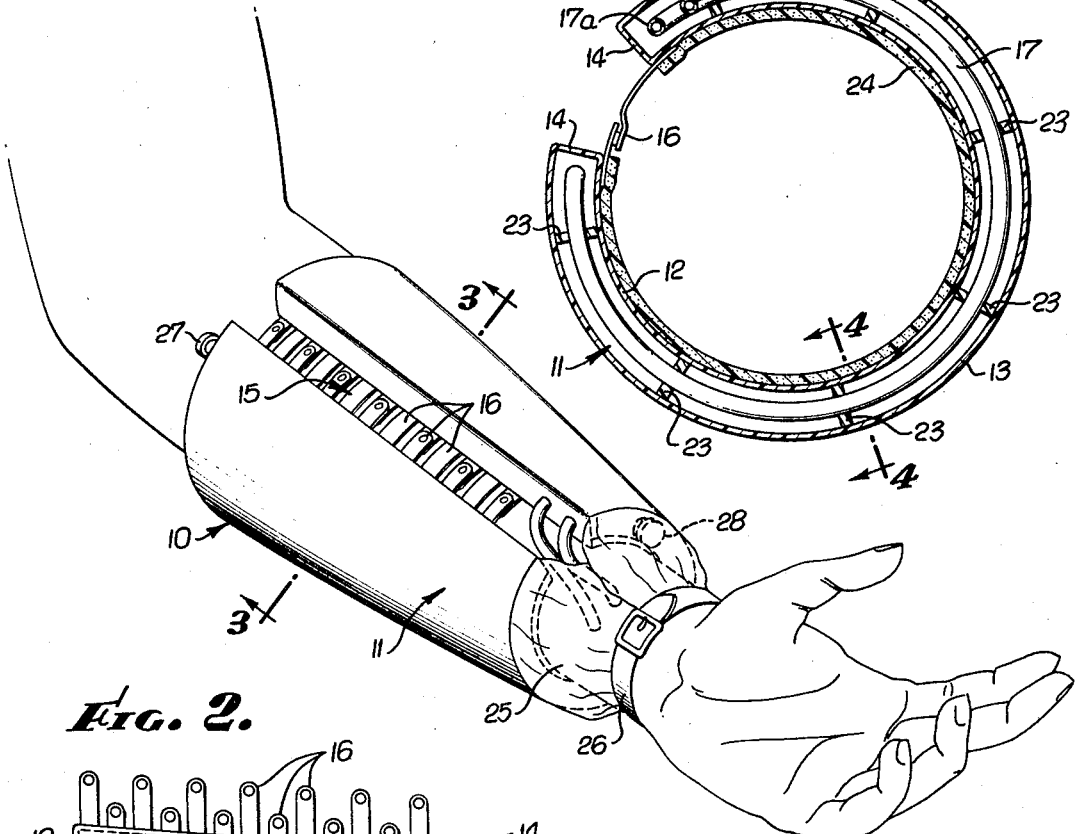
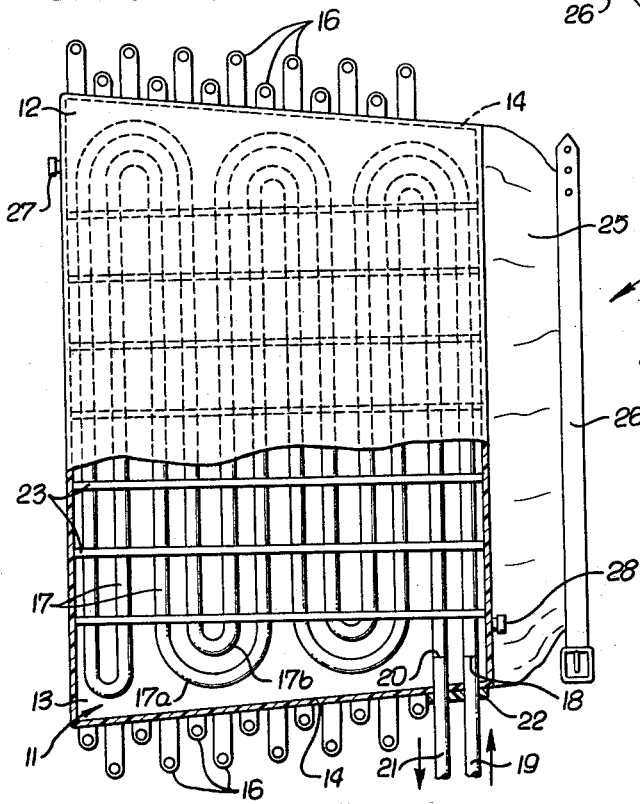
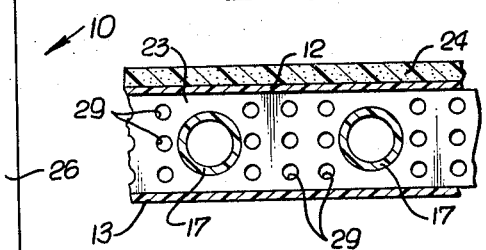
ROBERT D. SCOTT
INVENTOR.
By White & Haefliger
ATTORNEYS.

United States Patent Office 3,388,803
Patented June 18, 1968

3,388,803
WEARABLE DIALYSIS APPARATUS
Robert D. Scott, Los Angeles, Calif., assignor to Applied Biological Sciences Laboratory, Inc., Glendale, Calif., a corporation of California
Filed Apr. 16, 1965, Ser. No. 448,713
14 Claims. (Cl. 210—321)

ABSTRACT OF THE DISCLOSURE

A dialysis chamber conforming to the shape of a portion of the human body, removably attached thereto, and having a tubular, repeatedly deflected membrane therein.

---

This invention has to do with equipment for blood purification or correction by a verison of the generally known dialysis technique, and is characterized by reaction of the required equipment to a compact and relatively inexpensive form applicable to the human body and capable of continuous performance by connection with the venous system of the wearer to remain active.

Thus the invention is intended to obviate necessity for such large and costly forms of essentially fixed equipment presently used as "artificial kidneys," and which immobilize the patient during periods of blood dialysis for separation of toxic accumulations.

The invention has for its general object to provide a compact, wearable appliance embodying the combination of a dialysis fluid chamber, and a dialysis membrane separating the chamber fluid from an elongated blood passage terminally connectable into the venous system of the wearer so that under the pumping action of the heart, blood may undergo constant toxicity reducing dialysis by continuous flow through the passage.

In more particular aspects, the invention contemplates construction of the chamber and membrane assemblage in a manner flexibly conformable to a selected portion of the body, e.g. arm, leg or torso, upon any of which the appliance may be designed for accommodation and appropriate venous connections. For use in this manner, the dialysis chamber may be formed of flexible material, typically a suitable plastic, which is inert to the dialysis fluid and which has flexible conformity to the body.

The dialysis membrane is used in a form an arrangement such as to afford adequate surface area in exposure to the circulating blood and dialysis fluid, to effect that degree or rate of toxic component transfer and isolation through the membrane, that will maintain an acceptably low level of toxicity in the blood stream.

While capable of different forms and arrangements, the membrane preferably is formed as a continuous tube, and may be sufficiently extended for necessary total surface area, by an appropriate number of supported reverse turns of the tube within the chamber. As will appear, the tube has inlet and outlet terminals with tubular venous connectors.

The invenion has various additional features and objects, including provision, in one embodiment, of a wraparound fastenable chamber configuration, utilization of a body surface covering associated with the chamber and adapted to overlie the venous connectors, as well as various other details, all of which will be understood from the following detailed description of the accompanying drawing, in which:

FIG. 1 is a view showing in perspective an embodiment of the application designed typically for application to the arm;

FIG. 2 is a view partly in section showing the appliance in essentially flattened or distended condition;

FIG. 3 is an enlarged cross section taken through the appliance on line 3—3 of FIG. 1; and FIG. 4 is a fragmentary enlarged section taken on line 4—4 of FIG. 3.

As previously indicated, the appliance generally indicated at 10 may be designed and constructed in various specific forms adapted for association with different parts of the body which are suitable for wearing of the appliance and the making of artery and venous connections with the wearer. Merely as illustrative, the appliance 10 is shown for purposes of description herein to be designed for application to the human arm at a location between the wrist and elbow and permitting free normal flexure at these locations.

It is further observed preliminarily that the art of blood dialysis in the respects generally of useable dialysis materials, including membranes, as well as impurity-receiving dialysis fluids, are well known, and in themselves are not claimed to be novel herein. However, the invention is believed to mark the first instance in which such materials have been employed in body appliances for blood dialysis, in the manner and according to the structural assemblage later described.

It is known that blood dialysis, specifically for the purpose of ridding the blood of uric acid and possibly other contaminants removed by the kidneys, may be separated by dialysis through membranes having in the order of 0.1–1000 mils thickness, of such materials as cellophane, sausage casing or a dialysis membrane material distributed by Sweet & Freezer of Seattle, Wash., under the trade name "Cupraphane." These membranes have the ability to grossly contain blood flow while allowing dialysis of chemical imbalances to pass through the membrane. Thus if on one side of the membrane the blood has an excessive content of uric acid and on the other side of the membrane the dialysis fluid has a normal or lesser amount of acid the membrane will allow this imbalance to be corrected by passage through the membrane of uric acid molecules until balance is achieved. For purposes of the present inventon, "Cupraphane" may be regarded as a preferred though typical membrane material.

Referring to the drawing, the appliance is shown to comprise a flexible chamber 11 defined by spaced inner and outer walls 12 and 13, and end closures 14. This chamber may be made of any suitable material having adequate flexibility for conformance to the portion of the body to which it is applied, and which is inert to the dialysis fluid. Thin sheet inert metal or more preferably sheet plastic such as poly-urethane, or poly vinyl chloride may be used as the chamber wall material, as well as for the later described flexible tubular terminals and membrane supports inside the chamber. The latter is shown in FIG. 1 to have the form of a split sleeve equipped at opposite sides of the split 15 with fasteners 16 which may be releasably interengaged to hold the chamber in place.

The dialysis membrane is shown to be formed as a continuous tube 17 typically of about ⅜ inch diameter having parallel extents as illustrated in FIG. 2 with integral outer return bands 17a and inner return bands 17b affording continuity of extent from a connection at 18 with a flexible blood inlet tube 19 and at 20 with a similar flexible outlet tube 21, both tubes being sealed to the chamber wall at 22. The tube extents are shown to be carried by spaced supports 23 through which the tube extends, the supports being apertured at 24 to permit passage of the dialysis fluid.

Referring to FIG. 3, the chamber may be lined with a separable pad 24 intended to cushion the chamber association with the body surface, and which may be made of any of such materials as sponge rubber, polyurethane or the like. Attached to and extending beyond the wrist end of the chamber is a flexible plastic shield or covering 25 carrying strap 26 which may be fastened about the wrist as in FIG. 1 to secure the assemblage in place. Tubes 19 and 21 are extended through the shield 25 and are attached to suitable sterile catheters, not shown, which are inserted appropriately into the arterial and venous system of the wearer so that the heart pumps blood continuously through the inlet tube 19, thence through the tubular membrane 17, and ultimately is returned to the body through the outlet tube 21.

The chamber 11 is provided with an inlet 27 through which fresh dialysis fluid may be filled into the chamber with the latter held in an upright position with the inlet at the top. Bottom outlet 28 is provided for drainage of spent dialysis fluid from the chamber. As will be understood, the inlet and outlet have appropriate screw cap or other closures.

The dialysis fluids to be filled into the chamber sufficiently for complete emersion of the tube 17, may differ in specific composition depending upon the blood condition of the patient and is subject to medical determination and prescription, as will be understood by those familiar with blood dialysis. Essentially the dialiysis fluid may correspond in composition to a healthy or desired, constituency of the blood of the patient, such consistency, as previously indicated, having a capacity for acceptance of the patients blood acidic impurity by dialysis through the tubular membrane. It will be understood of course that proper precautions will be taken for maintenancy of sterility in the chamber as well as facilities for transferring stored blood from containers to the chamber.

I claim:

1. Dialysis equipment adapted to be worn on a portion of the human body and comprising means forming a closed dialysis fluid chamber, said means being conformable to said body portion, elongated blood dialysis membrane material defining an extended flow passage within said chamber of great length in relation to chamber size, said membrane being repeatedly deflected to form continuous flow segments within the chamber dimensions, said passage having an inlet and an outlet connectible into the venous system of the wearer, said membrane serving to pass and isolate a toxic blood component into the dialysis fluid, and means for removably attaching the combined chamber and membrane material to the body of the wearer.

2. Equipment according to claim 1, in which said membrane is capable of dialysis passage of uric acid.

3. Equipment according to claim 1, in which said chamber and membrane have flexible conformity to the body of the wearer.

4. Equipment according to claim 1, in which said membrane extends reversely uniformly within said chamber.

5. Equipment according to claim 1, comprising also a body surface covering extending beyond said chamber.

6. Equipment according to claim 5, in which said inlet and outlet include tubing connections extending through said covering.

7. Dialysis equipment adapted to be worn on a portion of the human body, comprising means forming a closed dialysis fluid chamber, said means flexibly conformable to said body portion, an elongated hollow blood dialysis membrane within said chamber and having an inlet and an outlet connectible into the venous system of the wearer, said hollow membrane forming a flow passage of great length in relation to chamber size, said membrane being repeatedly deflected to form continuous flow segments within the chamber dimensions and serving to reversely pass through the chamber and isolate a toxic blood component into the dialysis fluid, and means for removably attaching the chamber to the body of a wearer.

8. Equipment according to claim 7, in which said chamber and membrane have flexible conformity to the body of the wearer.

9. Equipment according to claim 8, in which said membrane is capable of dialysis passage of uric acid.

10. Equipment according to claim 8, in which said tubular membrane has reversely continuous and generally parallel extents.

11. Equipment according to claim 10, including means for supporting said extents of the membrane in generally parallel relation.

12. Equipment according to claim 11, in which said attachment means is connected to opposite sides of the chamber.

13. Equipment according to claim 11, including also a flexible body surface covering extending beyond said chamber, and an attachment band associated with said covering.

14. Equipment according to claim 13, in which said inlet and outlet include tubing connections extending beneath said covering.

References Cited

UNITED STATES PATENTS

| | | | |
|---|---|---|---|
| 2,664,395 | 12/1953 | Marchand | 210—321 |
| 2,715,097 | 8/1955 | Guarino | 210—416 X |
| 3,015,331 | 1/1962 | Warrick | 23—258.5 |

OTHER REFERENCES

Bodell et al.: "An Implantable Artificial Lung," J.A.M.A., vol. 191, No. 4, Jan. 25, 1965, pp. 125–127, published by American Medical Assn., 535 N. Dearborn St., Chicago, Ill.

Nordisk Medicin, vol. 48, 1952, pp. 1458 and 1459.

Bluemle, Jr., et al.: "A Compact Blood Dialyzer Without Membrane Supports: Design and Fabrication," from Transactions American Society For Artificial Internal Organs, vol. XI, held April 9 and 10, Atlantic City, N.J., received in Patent Office July 15, 1965, pp. 157–160. Copies may be ordered from Dr. George E. Schreiner, Georgetown University Hospital, Washington, D.C.

Kolff: (an outline), from Transactions of the American Society For Artificial Internal Organs, received by Patent Office June 4, 1963, pp. 368–382 (pp. 368, 380 and 381 relied on). Copies may be ordered from Dr. George E. Schreiner, Dept. of Medicine, Georgetown University Hospital, Washington, D.C.

REUBEN FRIEDMAN, *Primary Examiner.*

F. SPEAR, *Assistant Examiner.*

UNITED STATES PATENT OFFICE
CERTIFICATE OF CORRECTION

Patent No. 3,388,803

June 18, 1968

Robert D. Scott

It is certified that error appears in the above identified patent and that said Letters Patent are hereby corrected as shown below:

In the heading to the printed specification, lines 3 to 5, "assignor to Applied Biological Sciences Laboratory, Inc., Glendale, Calif., a corporation of California" should read -- assignor, by mesne assignments, to Robert D. Scott, West Covina, Calif. --.

Signed and sealed this 9th day of December 1969.

(SEAL)
Attest:

Edward M. Fletcher, Jr.
Attesting Officer

WILLIAM E. SCHUYLER, JR.
Commissioner of Patents